United States Patent [19]

Hattori et al.

[11] Patent Number: 4,485,423
[45] Date of Patent: Nov. 27, 1984

[54] POWER SOURCE FOR CONTROL EQUIPMENT

[75] Inventors: Masayuki Hattori, Hachioji; Shigeo Nakamura, Hino, both of Japan

[73] Assignee: Fujitsu Fanuc Limited, Tokyo, Japan

[21] Appl. No.: 394,940

[22] PCT Filed: Oct. 28, 1981

[86] PCT No.: PCT/JP81/00306
§ 371 Date: Jun. 28, 1982
§ 102(e) Date: Jun. 28, 1982

[87] PCT Pub. No.: WO82/01625
PCT Pub. Date: May 13, 1982

[30] Foreign Application Priority Data

Oct. 29, 1980 [JP]  Japan .................................. 55-151784

[51] Int. Cl.³ .............................................. H02J 1/00
[52] U.S. Cl. ...................................................... 361/92
[58] Field of Search .................................... 361/90, 92

[56] References Cited

FOREIGN PATENT DOCUMENTS 0022549  2/1979  Japan ...................................... 361/92

Primary Examiner—Harry E. Moose, Jr.
Attorney, Agent, or Firm—Staas & Halsey

[57] ABSTRACT

A power source for control equipment which is designed so that even if one or more independent power sources (700) are added to a main power source (600), the power source arrangement, as viewed from the control equipment supplied with power therefrom, can always be regarded as if one power source were connected thereto. The operative state of control circuit power sources (601, 701) provided in the main power source (600) and the additional power source (700) is detected by control circuit power source abnormality detecting circuits (603, 703), and the operative state of driving power sources (602, 702) provided in the main power source (600) and the additional power source (700) is detected by driving power source abnormality detecting circuits (604, 704). All the driving power sources (602, 702) are turned ON substantially concurrently after the outputs from all the control circuit power sources (601, 701) have reached their normal state, and they are turned OFF substantially concurrently when the output from any one of the control circuit power sources (601, 701) has become abnormal. An enable signal (EN), which is sent to the control equipment, is turned ON after all the control circuit power sources (601, 701) and driving power sources (602, 702) have reached their normal operative state, and is turned OFF when an abnormality has occurred in any one of the power sources.

7 Claims, 7 Drawing Figures

4,485,423

POWER SOURCE FOR CONTROL EQUIPMENT

BACKGROUND OF THE INVENTION

The present invention relates to a control equipment power source for supplying power to control equipment, such as numerical control equipment.

In general, control equipment, such as numerical control equipment, contains a memory circuit, an I/O interface circuit and so forth in addition to a control circuit, such as a processor. In the case where the control circuit and the I/O interface circuit and so on operate on different drive voltages, a control equipment power source arrangement is required that provides a power source for supplying electric power necessary for operating the control circuit (which power source will hereinafter be referred to as the control circuit power source) and a power source for supplying electric power necessary for driving the memory circuit for its read/write operations and for driving the I/O interface circuit (which power source will hereinafter be referred to as the driving power source).

Further, in this kind of control equipment,

1. Various check functions for preventing malfunction are included corresponding to the controlled systems but, in many cases, these check functions are not assured in the case of an abnormality in the power source system;

2. It is desired that stored contents of various memory circuits be retained at the time of the power source being ON and OFF; and 3. It is desired that no unnecessary signals be sent from the interface circuit to a controlled system, for instance, a machine tool in a transient state at the time of the ON-OFF operation of the power source.

For the abovesaid reasons, the control equipment power source arrangement is required to have the following functions:

(1) A function of detecting power source abnormalities and cutting off the power source for preventing malfunctions resulting therefrom;

(2) maintenance of a power down sequence for preventing malfunctions at the time of the ON-OFF operation of the power source; and (3) a function of quickly providing power source OFF information to the control equipment to stop, for example, the read/write operation of the memory circuit.

To achieve such functions as mentioned above, according to the prior art, for example, as shown in FIG. 1, a control equipment power source 102 having a control circuit power source 100 and a driving power source 101 is provided with a control circuit power source abnormality detecting circuit (hereinafter referred to as the EC power source abnormality detecting circuit) 103 for detecting abnormalities in the control circuit power source 100 and a driving power source abnormality detecting circuit (hereinafter referred to as the ED power source abnormality detecting circuit) 104 for detecting abnormalities in the driving power source 101, and outputs from the both detecting circuits are processed to perform a power down sequence such, for instance, as shown in FIG. 2, thereby performing the above-mentioned functions (1) and (3).

That is, when a power source switch 105 is turned ON to connect an AC power source 106 to the control equipment power source 102, an output Ec from the control circuit equipment power source 100 is caused to rise first and then, at the moment when the output Ec reaches its steady state, an output Ed from the driving power source 101 is caused to rise. At the moment when the outputs Ec and Ed both reach the steady state, an enable signal EN, which informs control equipment 107 of the presence or absence of a power source abnormality, is turned ON, thereby preventing malfunction of the control equipment 107 and a controlled system 108. When a power source abnormality is detected by the detecting circuits 103 and 104, the enable signal EN is immediately turned OFF and, after a predetermined period of time, the driving power source 101 is forcibly turned OFF and the power source switch 105 is turned OFF by a switch control signal or an alarm signal ALM, by which the driving power source output Ed is completely turned OFF before the output Ec from the control circuit power source 100 becomes unstable as shown in FIG. 2, thus preventing malfunction. Further, since the enable signal EN is turned OFF first, the operation of the memory circuit can be stopped quickly when the power source is turned OFF.

In such control equipment as mentioned above, it happens that when the control function is extended, for instance, when the number of axes to be controlled is increased in numerical control equipment, the power source capacity becomes insufficient only with the control equipment power source 102 shown in FIG. 1 and one more power source must be provided. For example, there are some occasions when the addition of an extension 300 to the control equipment 107 is accompanied by the provision of a driving power source 301 alone as shown in FIG. 3, a control circuit power source 400 alone as shown in FIG. 4 or a control circuit power source 500 and a driving power source 501 as shown in FIG. 5. In FIGS. 3 to 5, the parts corresponding to those in FIG. 1 are identified by the same reference numerals, and 302 indicates increased power sources.

In such a compound power source in which an additional power source is provided separately from a main power source, it is necessary that the aforementioned functions be satisfied as a whole. The prior art merely adopts an arrangement such that only the main power source performs such a power down sequence as shown in FIG. 2, or the main power source and the additional power source execute the above-described power down sequence independently of each other. Accordingly, the prior art has defects that, for example, even if the additional power source is broken down, the main power source continues to operate, that the sequence shown in FIG. 2 is not satisfied between the output $Ec_1$ from the control circuit power source of the main power soruce and the output $Ed_2$ from the driving power source of the additional power source, and that since the compound power source, as viewed from the side of the control equpment, cannot be regarded as one power source connected thereto, processing in the case of a power source abnormality is complex and difficult on the side of the control equipment.

SUMMARY OF THE INVENTION

The present invention has overcome such defects of the prior art, and has for an object to provide a power source system by which the aforementioned functions (1) to (3) can be performed in a control equipment power source arrangement provided with one or more additional power sources each having housed therein at least one of a control circuit power source and a driving power source, separately from a main power source having housed therein a control circuit power source and a driving power source, and by which the power source arrangement, as viewed from the control equipment, can always be regarded as if one power source were connected thereto regardless of whether the additional power source is provided. The invention will hereinafter be described in detail in connection with its embodiment.

According to the present invention, EC power source abnormality detecting circuits and ED power source abnormality detecting circuits are provided in a main power source and an additional power source. When it is decided from a signal obtained by ORing the detected outputs from all the EC power source abnormality detecting circuits that all control circuit power sources have reached their normal state, all driving power sources are turned ON substantially simultaneously, and when it is decided that the abnormality has occurred in any one of the control circuit power sources, all the driving power sources are substantially concurrently turned OFF after a predetermined period of time. Furthermore, when it is decided from a signal obtained by ORing the detected outputs from both types of circuits that all the control circuit power sources and driving power sources have reached their normal state, an enable signal is turned ON, and when it is decided that abnormality has occurred in any one of the power sources, the enable signal is turned OFF and a power source switch is turned OFF.

DESCRIPTION OF THE PREFERRED EMBODIMENT

Figure 1:
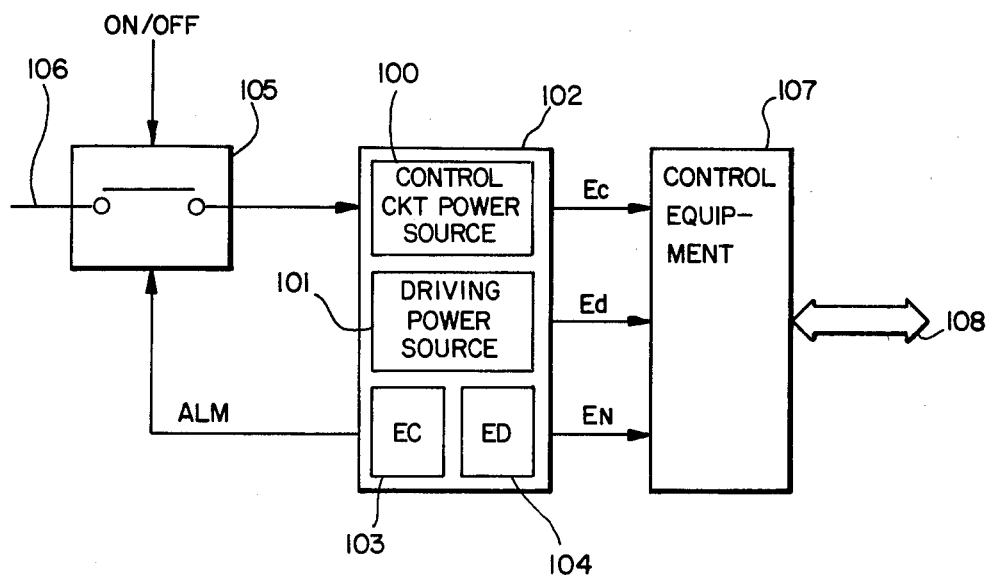
FIG. 1 is a block diagram of the arrangement of a conventional control equipment power source.
Figure 2:
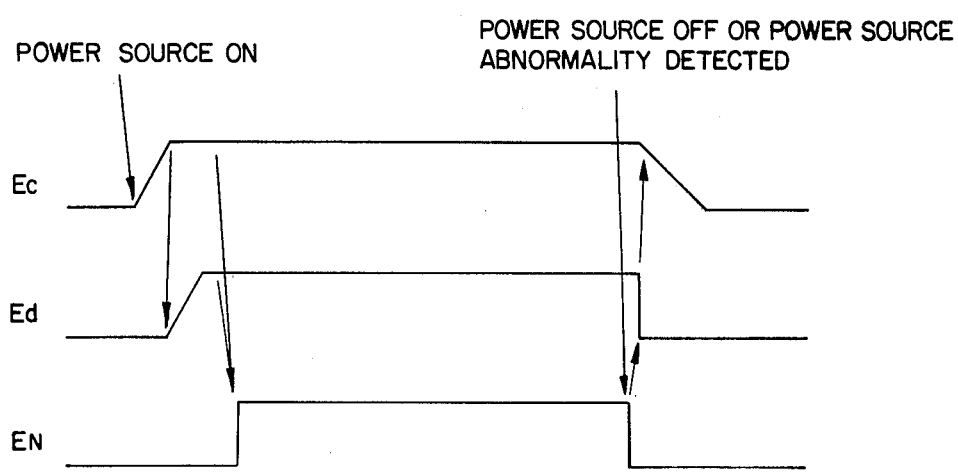
FIG. 2 is a waveform diagram explanatory of its operation.
Figure 3:
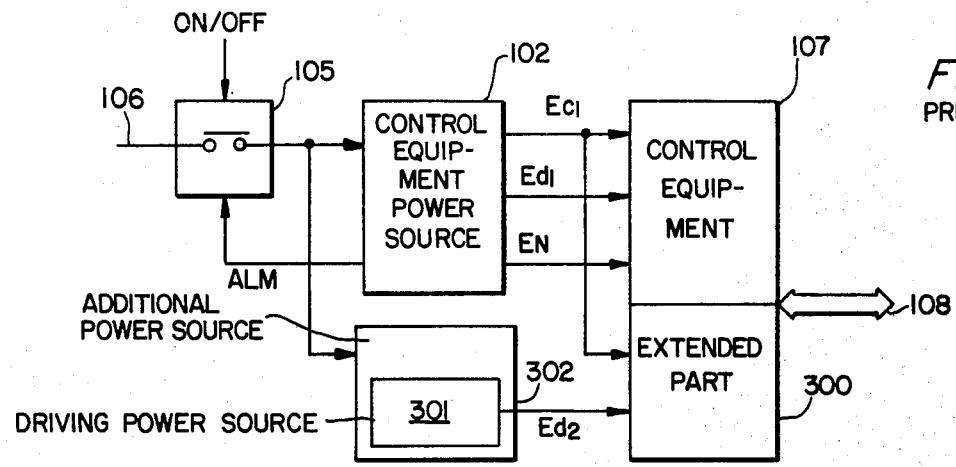
FIGS. 3 to 5 are block diagrams showing examples of additional power sources.
Figure 4:
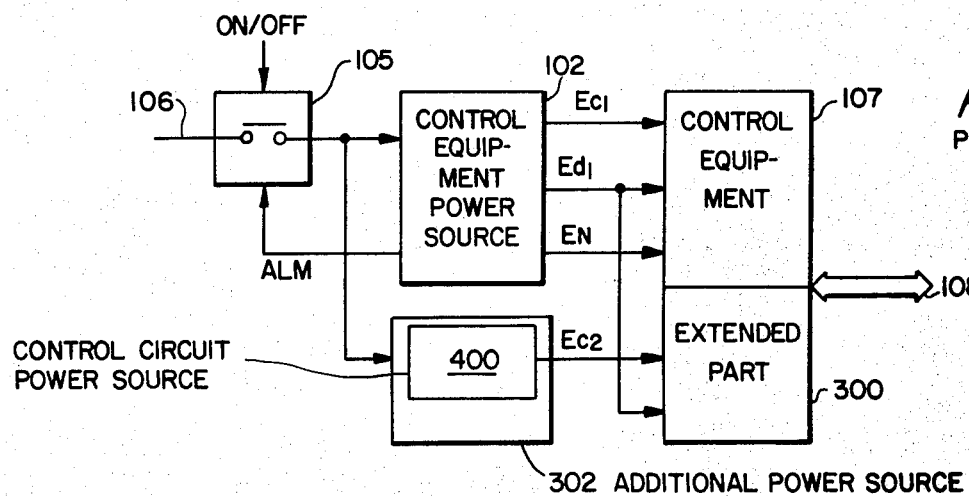
Figure 5:
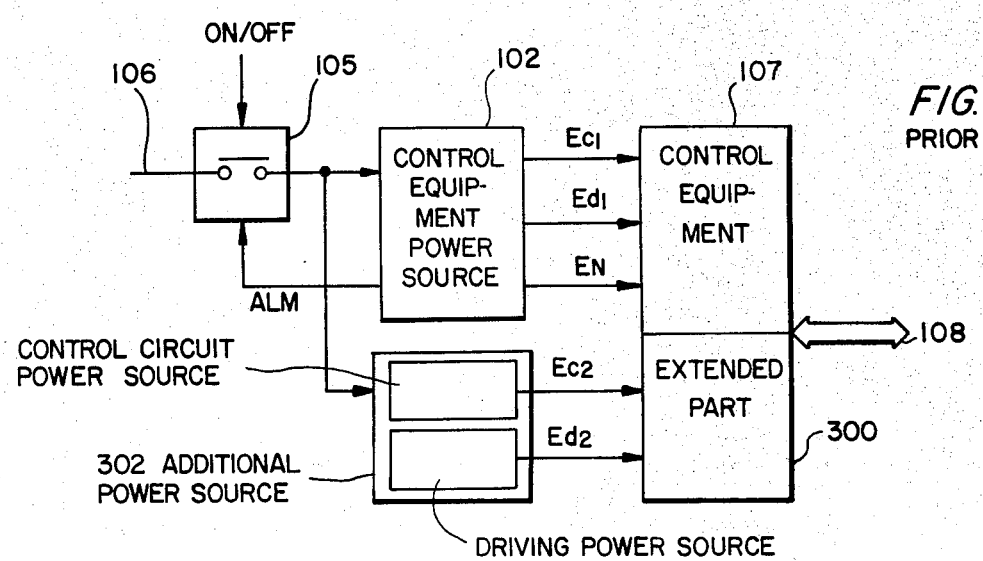
Figure 6:
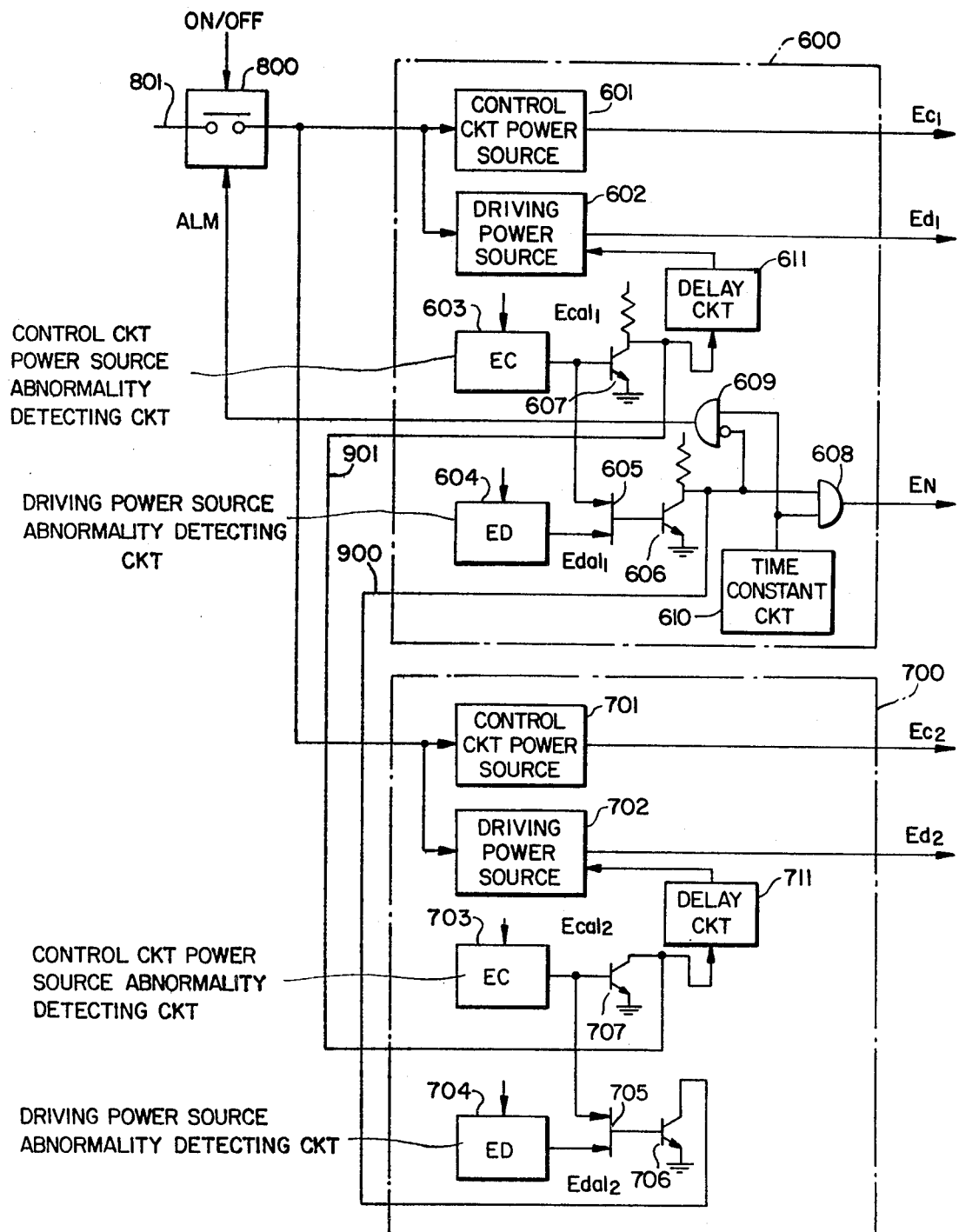
FIG. 6 is a circuit diagram illustrating the principal part of the arrangement of the device embodying the present invention.

FIG. 6 is a circuit diagram illustrating the principal part of the arrangement of an embodiment of the present invention. Reference numeral 600 indicates a main power source having housed therein a control circuit power source 601 and a driving power source 602, 700 an additional power source having housed therein a control circuit power source 701 and a driving power source 702, and 800 a power source switch for connecting and disconnecting the main power source 600 and the additional power source 700 from an AC power source 801, which power source switch can be manually turned ON and OFF by an operator and is forcibly turned OFF by an alarm signal ALM described later.

The main power source 600 is provided with an EC power source abnormality detecting circuit 603, and an ED power source abnormality detecting circuit 604. As these detecting circuits 603 and 604, use can be made of detecting circuits, for instance, of the type for comparing input and output voltages of the power sources 601 and 602 with reference voltages to detect abnormality of the power sources. Detected outputs or detection signals $Ecal_1$ and $Edal_1$ from the both detecting circuits 603 and 604 are provided via an OR circuit 605 to the base of a transistor 606 making a combining circuit, and the detected output $Ecal_1$ from the EC power source detecting circuit 603 is also applied to the base of a transistor 607.

The additional power source 700 is provided with an EC power source abnormality detecting circuit 703 for detecting abnormality of the control circuit power source 701 and an ED power source abnormality detecting circuit 704 for detecting abnormality of the driving power source 702. As is the case with the main power source 600, detected outputs or detection signals $Ecal_2$ and $Edal_2$ from the both detecting circuits 703 and 704 are ORed by an OR circuit 705 and the ORed output is provided to the base of a transistor 706 making another combining circuit, and the detected output $Ecal_2$ from the EC power source abnormality detecting circuit 703 is also applied to the base of a transistor 707.

The collector of the transistor 606 is connected to one input terminal of each of AND circuits 608 and 609 and to the collector of the transistor 706 via an additional power source interface line 900. Accordingly, there is provided on the additional power source interface line 900 an indication signal or a NOR logical signal of the detected outputs from all the EC power source abnormality detecting circuits 603 and 703 and all the ED power source abnormality detecting circuits 604 and 704. Further, a circuit 610 provided in the main power source 600 is a time constant circuit having a set time delay $T_1$, which is started at the time of turning ON the power source switch 800 and, after the time $T_1$, continues to apply a logic "1" to the AND circuits 608 and 609. As a result, when all the control circuit power sources and driving power sources reach their normal state, an enable signal EN is turned ON at the time $T_1$ after turning ON the power source switch 800. When an abnormality occurs in any one of the control circuit power sources 603 and 703 or the driving power sources 604 and 704 while in operation, the enable signal EN is immediately turned OFF and, at the same time, the alarm signal ALM is applied to the power source switch 800.

The collector of the transistor 607 is connected to an input terminal of a delay circuit 611 of having a delay time $T_2$ making a driving power source control circuit and, further, it is connected via an additional power source interface line 901 to the transistor 707 which has its collector connected to an input terminal of a delay circuit 711 similarly having the delay time $T_2$ and making another power source control circuit. Accordingly, there is provided on the additional power source interface line 901 another indication signal or a NOR logic output signal of the detected outputs from all the EC power source abnormality detecting circuits 603 and 703.

The delay circuits 611 and 711 are started by the above-described NOR logic signal on the additional power source interface line 901 when all the control circuit power sources 601 and 701 become normal and, after the time $T_2$, turn ON the driving power sources 602 and 702 substantially at the same time by generating a control signal. Further, they are started also when any one of the control circuit power sources becomes abnormal and, after the time $T_2$, they turn OFF the driving power sources 602 and 702. In this embodiment the ON-OFF operation of the driving power sources is controlled by the delay circuits 611 and 711 having the same construction, however, delay may also be effected by different circuits.

In the above arrangement, the OR circuits 605 and 705, the transistors 606 and 706, the additional power source interface line 900, the AND circuits 608 and 609 and the time constant circuit 610 make up a control circuit which performs the ON-OFF control of the enable signal EN and the alarm signal ALM, and the transistors 607 and 707, the additional power source interface line 901 and the delay circuits 611 and 711 make up a control circuit which performs the ON-OFF control of the driving power souces 602 and 702 in accordance with the aforementioned sequence.

Figure 7:
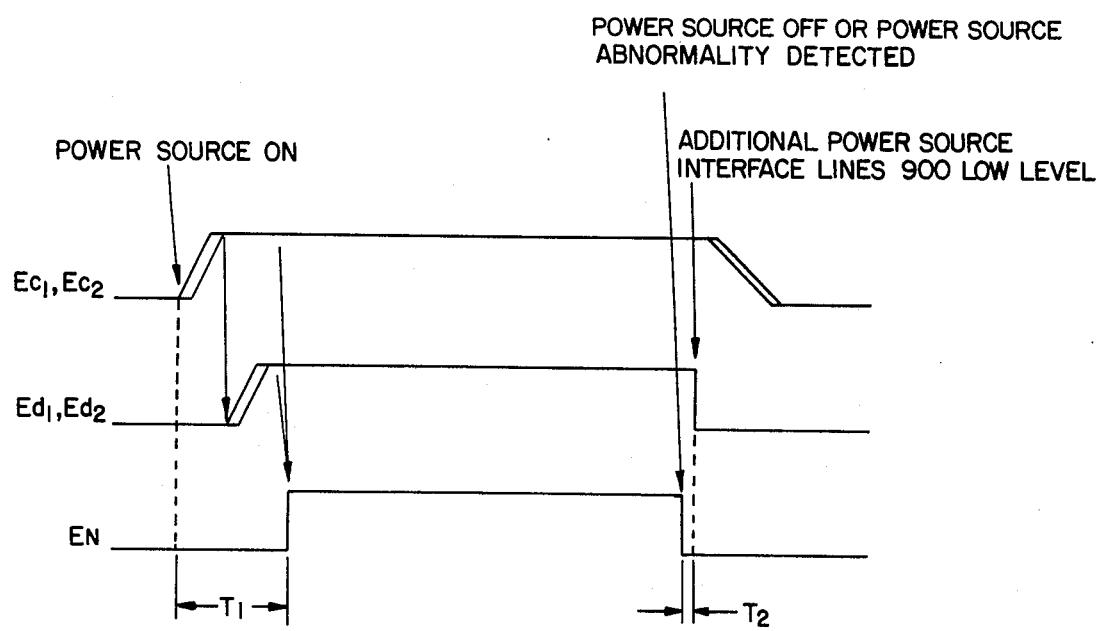
FIG. 7 is a diagram explanatory of its operation.

FIG. 7 is a diagram showing variations in the outputs $Ec_1$ and $Ec_2$ from the control circuit power sources, the outputs $Ed_1$ and $Ed_2$ from the driving power sources and the enable signal EN in the case where the device of FIG. 6 is operated. Referring now to FIG. 7, the operation of the device of FIG. 6 will be described.

When the power source switch 800 is turned ON by the operator, the control circuit power sources 601 and 701 are started at first and their outputs $Ec_1$ and $Ec_2$ rise with some dispersion therein or time delay as shown in FIG. 7. When all the control circuit power sources reach their normal state, the additional power source interface line 901 becomes a high-level to start the delay circuits 611 and 711, by which the driving power source outputs $Ed_1$ and $Ed_2$ rise as shown in FIG. 7. When all the control circuit power source outputs $Ec_1$ and $Ec_2$ and driving power source outpus $Ed_1$ and $Ed_2$ have risen to reach their normal state, the additional power source interface line 900 becomes the high-level to open the AND circuit 608 and, after the time $T_1$, the enable signal EN is turned ON.

Next, when the power source switch 800 is turned OFF by the operator, abnormality of the control circuit power sources 601 and 701 is detected by the EC power source abnormality detecting circuits 603 and 703. As a consequence, the additional power source interface line 800 becomes a low-level and the enable signal EN is immediately turned OFF and, after the time $T_2$, all the driving power sources are forcibly turned OFF. Thereafter the control circuit power source outputs $Ec_1$ and $Ec_2$ gradually fall.

Moreover, in the case of an abnormality occurring in any one of the control circuit power sources or the driving power sources, since the additonal power source interface line 900 becomes the low-level, the enable signal EN is immediately turned OFF and, at the same time, the power source switch 800 is turned OFF by the alarm signal ALM and, after the driving power sources 602 and 702 are forcibly turned OFF, the control circuit power source outputs $Ec_1$ and $Ec_2$ fall. Also in this case, the aforementioned power down sequence is satisfied.

As has been described in the foregoing, according to the present invention, in a control equipment power source arrangement which has, in addition to a main power source having a control circuit power source and a driving power source, one or more additional power sources each having at least one of the aforementioned control circuit power source and the aforementioned driving power source, there are provided in each of the main power source and the additional power source an EC power source abnormality detecting circuit and ED power source abnormality detecting circuit. When it is decided from a signal obtained by ORing the detected outputs from all the EC power source abnormality detecting circuits that all the control circuits have reached their normal state, all the driving power sources are turned ON substantially concurrently; when it is decided that an abnormality has occurred in any one of the control circuit power sources, all the driving power sources are turned OFF substantially at the same time after a predetermined period of time; when it is decided from a signal obtained by ORing the detected outputs from all the EC and EC power source abnormality detecting circuits that all the control circuit power sources and driving power sources have reached their normal state, an enable signal is turned ON; and when it is decided that an abnormality has occurred in any one of the power sources, the enable signal is turned OFF and, at the same time, a power source switch is turned OFF. Since the aforementioned functions (1) to (3) are thus performed in the control equipment power source arrangement as a whole, it is possible to prevent, with certainty, malfunction in the transient state at the time of turning ON and OFF the power sources. In addition, since the power source arrangement, as viewed from the control equipment, can always be regarded as if one power source were connected thereto regardless of the presence or absence of the additional power source, processing in the case of the occurrence of a power source abnormality can be effected with ease.

We claim:

1. A compound power source for control equipment, comprising:
   a power source switch;
   a main power source and at least one additional power source, each of said main and additional power sources operatively connected to said power source switch and comprising:
      control circuit and driving power sources operatively connected to said power source switch;
      a control circuit power source abnormality detecting circuit, operatively connected to said control circuit power source, for detecting abnormality of said control circuit power source and generating an output;
      a driving power source abnormality detecting circuit, operatively connected to said driving power source, for detecting abnormality of said driving power source and generating an output;
      a control circuit, operatively connected to said driving power source, said control circuit power source abnormality detecting circuit and said driving power source abnormality detecting circuit, for turning ON said driving power source a predetermined period of time after said control circuit power source abnormality detecting circuit decides that said control circuit power source has become normal, and for turning OFF said driving power source a predetermined period of time after said control circuit power source abnormality detecting circuit decides that abnormality has occurred in said control circuit power source; and
      an OR circuit, operatively connected to said control circuit power source abnormality detecting circuit and said driving power source abnormality detecting circuit, for ORing the outputs of said control circuit power source abnormality detecting circuit and said driving power source abnormality detecting circuit and generating an output;
   a first interface, operatively connected to all said driving power sources and all said control circuit power source abnormality detecting circuits, for turning ON all said driving power sources substantially concurrently when it is decided from a signal obtained by ORing the outputs from all said control circuit power source abnormality detecting circuits that all said control circuit power sources have reached their normal state, and for turning OFF all said driving power sources substantially concurrently after a predetermined period of time when it is decided that abnormality has occurred in any one of said control circuit power sources; and a second interface, operatively connected to all said OR circuits, said driving power source abnormality detecting circuits, the control equipment and said power source switch, for turning ON an enable signal to be sent from said main power source to the control equipment when it is decided from the outputs from all said OR circuits that all said control circuit power sources and all said driving power sources have reached their normal state, and for turning OFF the enable signal and said power source switch, by a signal output only by said main power source, when it is decided that abnormality has occurred in any one of said control circuit power sources and said driving power sources.

2. A compound power source and control system for control equipment, comprising:

a power source switch;

a first power source operatively connected to said power source switch, comprising:

a first control circuit power source operatively connected to said power source switch and the control equipment;

a first driving power source operatively connected to said power source switch and the control equipment; and first control means, operatively connected to said first control circuit power source, said first driving power source, said power source switch and the control equipment, for detecting an abnormality in said first control circuit power source and said first driving source, for generating a switch control signal, for generating an enable signal, for generating a first driving power source control signal and for generating first and second indication signals; and at least one second power source operatively connected to said power source switch, said first power source and the control equipment, comprising:

a second control circuit power source operatively connected to said power source switch and the control equipment;

a second driving power source operatively connected to said power source switch and the control equipment; and second control means, operatively connected to said second control circuit power source, said second driving power source and said first control means, for detecting abnormality in said second control circuit and driving power sources, for generating third and fourth indication signals and for generating a second driving power source control signal, the power switch control signal and enable signal being generated in dependence upon the second or fourth indication signals, and the first and second driving power source control signals being generated with a first delay after one of said first and second driving power source abnormality detecting circuits have detected abnormality and after both said first and second driving power sources have returned to normal following abnormality detected in one of said first and second driving power sources.

3. A compound power source and control system for control equipment as recited in claim 2, wherein said first control means comprises:

a first abnormality detecting circuit, operatively connected to said first control circuit power source, for generating a first detection signal;

a second abnormality detecting circuit, operatively connected to said first driving power source, for generating a second detection signal;

first driving control means, operatively connected to said first abnormality detecting circuit, said second control means and said first driving power source, for generating the first indication signal in dependence upon the first detection signal and for generating the first driving power source control signal in dependence upon the first detection signal or the third indication signal;

first combining means, operatively connected to said first and second abnormality detecting circuits and said second control means, for generating the second indication signal in dependence upon the first or second detection signals; and control and signal means, operatively connected to said first combining means, said second control means, said power source switch and the control equipment, for generating the enable signal and the switch control signal in dependence upon the second or fourth indication signals after a predetermined second delay.

4. A compound power source and control system for control equipment as recited in claim 3, wherein said second control means comprises:

a third abnormality detecting circuit, operatively connected to said second control circuit power source, for generating a third detection signal;

a fourth abnormality detecting circuit, operatively connected to said second driving power source, for generating a fourth detection signal;

second driving control means, operatively connected to said third abnormality detecting circuit, said second driving power source and said first driving control means, for generating the third indication signal in dependence upon the third detection signal and for generating the second driving power source control signal in dependence upon the third detection signal or the first indication signal; and second combining means, operatively connected to said third and fourth abnormality detecting circuits and said control and signal means, for generating the fourth indication signal in dependence upon the third or fourth detection signals.

5. A compound power source and control system for control equipment as recited in claim 4, wherein said first and second driving control means each comprise:

a first transistor operatively connected to the respective said abnormality detecting circuit and the other of said first and second driving control means; and a delay circuit, operatively connected to said first transistor, the respective said driving power source and the other of said first and second driving control means.

6. A compound power source and control system for control equipment as recited in claim 5, wherein said first and second combining means each comprise:
   an OR circuit operatively connected to the respective ones of said first through fourth abnormality detecting circuits; and
   a second transistor operatively connected to said OR circuit and said control and signal means.

7. A compound power source and control system for control equipment as recited in claim 6, wherein said control and signal means comprises:
   a time constant circuit operatively connected to said power source switch;
   a first AND gate operatively connected to said time constant circuit, said second transistor of both said first and second combining means and the control equipment; and
   a second AND gate operatively connected to said time constant circuit, said second transistor of both said first and second combining means and said power source switch.

* * * * *

UNITED STATES PATENT AND TRADEMARK OFFICE
CERTIFICATE OF CORRECTION

PATENT NO.   : 4,485,423

DATED        : November 27, 1984

INVENTOR(S)  : Hattori et al.

It is certified that error appears in the above-identified patent and that said Letters Patent is hereby corrected as shown below:

Col. 2, line 52, "soruce" should be --source--.

Col. 4, line 43, delete "of" (second occurrence).

Col. 5, line 28, "outpus" should be --outputs--.

Signed and Sealed this

Thirtieth Day of July 1985

[SEAL]

Attest:

DONALD J. QUIGG

Attesting Officer    Acting Commissioner of Patents and Trademarks